US008428628B2

(12) United States Patent
Tanaka et al.

(10) Patent No.: US 8,428,628 B2
(45) Date of Patent: Apr. 23, 2013

(54) COMMUNICATION METHOD, MOBILE TERMINAL, SWITCHING DEVICE, AND RADIO CONTROL DEVICE

(75) Inventors: Itsuma Tanaka, Kanagawa (JP);
Keisuke Suzuki, Kanagawa (JP);
Masashi Kanauchi, Kanagawa (JP);
Kota Fujimura, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 317 days.

(21) Appl. No.: 12/674,371

(22) PCT Filed: Aug. 20, 2008

(86) PCT No.: PCT/JP2008/064834
§ 371 (c)(1),
(2), (4) Date: Apr. 13, 2010

(87) PCT Pub. No.: WO2009/025299
PCT Pub. Date: Feb. 26, 2009

(65) Prior Publication Data
US 2011/0124355 A1    May 26, 2011

(30) Foreign Application Priority Data

Aug. 21, 2007   (JP) .................................. 2007-215317

(51) Int. Cl.
*H04B 7/00*   (2006.01)

(52) U.S. Cl.
USPC ........................................................ 455/500

(58) Field of Classification Search .................. 370/338, 370/328; 455/445, 435, 456.1–456.6, 522, 455/436, 435.1, 500, 440, 441, 442, 448, 455/458, 439, 435.2, 435.3
See application file for complete search history.

(56) References Cited

U.S. PATENT DOCUMENTS

| 5,832,381 A | 11/1998 | Kauppi |
| 2002/0191554 A1* | 12/2002 | Kondo .......................... 370/328 |
| 2003/0050078 A1* | 3/2003 | Motegi et al. ................. 455/456 |

FOREIGN PATENT DOCUMENTS

| CN | 1133668 A | 10/1996 |
| JP | 4-123533 A | 4/1992 |
| WO | 95/11577 A1 | 4/1995 |

OTHER PUBLICATIONS

Extended Search Report for European Application No. 08828042.5 dated Dec. 23, 2011 (11 pages).
3GPP TSG SA WG2 Architecture—S2#52; S2-061652; "Hierarchical TA Concept", Shanghai, China, May 8-12, 2006 (5 pages).
3GPP TSG RAN WG3#51-Bis; R3-060457; "Equivalent Tracking Areas", Sophia-Antipolis, Apr. 3-5, 2006 (2 pages).
3GPP TSG RAN WG#57; R2-070688; "UE assisted tracking area update", St. Louis, USA, Feb. 12-16, 2007 (2 pages).
3GPP TR 23.880 V0.1.0 "Technical Specification Group Services and System Aspects", Oct. 2007 (24 pages).

(Continued)

*Primary Examiner* — Melody Mehrpour
(74) *Attorney, Agent, or Firm* — Osha Liang LLP

(57) ABSTRACT

A communication method according to the present invention includes: transmitting, at a radio base station device (b), broadcast information for notifying a first area and a second area; transmitting, from a first mobile terminal to a radio control device (c), a first location registration request signal for the first area included in the broadcast information, when the first area is not identical to a first area stored as a current location registration area; and transmitting, from a second mobile terminal to the radio control device (c), a second location registration request signal for the second area included in the broadcast information, when the second area is not included in a second area group stored as a current location registration area.

10 Claims, 15 Drawing Sheets

OTHER PUBLICATIONS

3GPP TSG SA WG2 Meeting #59; S2-073525 (SA WG2 Temporary Document), "A way forward for registration in densley-populated are" Helsinki, Finland Aug. 27-31, 2007 (4 pages).
International Search Report w/translation from PCT/JP2008/064834 dated Oct. 7, 2008 (5 pages).
Written Opinion from PCT/JP2008/064834 dated Oct. 7, 2008 (4 pages).
Patent Abstract of Japan; Publication No. 04-123533 dated Apr. 23, 1992 (1 page).
3GPP TSG RAN WG2 #58, R2-071658; "Discussion on RAN applications of Equivalent Tracking areas"; Alcatel-Lucent; Kobe Japan; May 7-11, 2007 (5 pages).
3GPP TSG SA WG2 Architecture—S2#SAEAdHoc; S2H06010; "Clarification for LERA"; ZTE; Paris, France; Apr. 3-6, 2006 (3 pages).
3GPP TSG SA WG2 Meeting #59; S2-073526; "Solution Guideline for Registration in Densely-populated area (RED)"; Helsinki, Finland; Aug. 27-31, 2007 (8 pages).
3GPP TS 23.401 V1.1.0; "GPRS enhancements for E-UTRAN access"; Jul. 2007 (78 pages).
3GPP TR 23.882 v1.11.0; "Report on Technical Options and Conclusions"; Jul. 2007 (210 pages).
Office Action for Japanese Patent Application No. 2007-215317 mailed Apr. 24, 2012, with English translation thereof (4 pages).
Office Action for Chinese Patent Application No. 200880103830.X issued Aug. 3, 2012, with English translation thereof (14 page).

* cited by examiner

COMMUNICATION METHOD, MOBILE TERMINAL, SWITCHING DEVICE, AND RADIO CONTROL DEVICE

TECHNICAL FIELD

The present invention relates to a communication method, a mobile terminal, an switching device, and a radio control device, in which a communication area is managed by being divided into multiple first areas (RA: Routing Area or LA: Location Area), as well as managed by being divided into multiple second areas (XA).

BACKGROUND ART

In a conventional mobile communication system, as shown in FIG. 1, when a commuter train or the like passes by a boundary region between location registration areas, mobile terminals (a) of all the users in the commuter train start transmitting location registration request signals concurrently. This causes over use of a radio capacity and an increase in processing load on an switching device. As a result, in a location registration area where the reception of the location registration request signals is concentrated, network congestion occurs and thereby access control is performed.

It has been a problem that, when such congestion occurs in the location registration processing, the mobile terminal (a) which is located in the area where the congestion occurs is also under the access control, and thus fails to perform incoming/outbound call processing and location registration processing.

To address such a problem, the 3GPP SAE (System Architecture Evolution) has proposed a "Multiple-TA system" configured to individually assign each mobile terminal multiple TAs (Tracking Areas) with which the mobile terminal has to register its location simultaneously.

As shown in FIG. 2, in the "Multiple-TA system", each of mobile terminals (A) to (C) is configured to simultaneously register its location with multiple TAs which are allocated to itself.

For example, the mobile terminal (A) is configured to register its location simultaneously with TA (A) to TA (C) in a boundary region between TA(O) (not shown) and TA(A), and to register its location simultaneously with TA(D) to TA(F) in a boundary region between TA(C) and TA(D) (see part (1) of FIG. 2).

To put it differently, the mobile terminal (A) is configured not to register its location in a boundary region between TA(A) and TA(B), for example.

Non Patent Document 1: 3GPP TS23.401 V1.1.0
Non Patent Document 2: 3GPP TS23.882 V1.11.0

Meanwhile, in a "Multiple-RA system" where the "Multiple-TA system" employed in the 3GPP SAE is applied to the current 3GPP mobile communication system, a mobile terminal registers its location simultaneously with multiple RAs as shown in FIG. 3(*a*) and FIG. 3(*b*). This raises a problem of making control rough in accuracy because the location registration area is excessively large. In addition, this also raises a problem that a paging amount directed especially to a mobile terminal not supporting "Multiple-RA system" is so increased that the service cannot be provided due to processing capacity, frequency limitation, or the like.

DISCLOSURE OF THE INVENTION

The present invention has been made to address the above problems, and aims to provide a communication method, a mobile terminal, a switching device, and a radio control device which enable decentralization of location registration processing by newly defining a location registration area (XA) in the "Multiple-TA system" and thereby making the location registration area (XA) usable in combination with existing location registration areas (RA/LA).

A first aspect of the present invention is summarized as a communication method in which a communication area is managed by being divided into a plurality of first areas, as well as managed by being divided into a plurality of second areas, the method including the steps of: transmitting, at a radio base station device, broadcast information for notifying the first area and the second area under control of the radio base station device; transmitting, from a first mobile terminal incapable of registering a location thereof with the second areas to the radio base station device, a first location registration request signal for the first area included in the broadcast information, when the first area is not identical to a first area stored as a current location registration area; and transmitting, from a second mobile terminal capable of registering a location thereof with the second areas to the radio base station device, a second location registration request signal for the second area included in the broadcast information, when the second area is not included in a second area group stored as a current location registration area.

In the first aspect, the communication method can further include the steps of: registering the location of the first mobile terminal with the first area in response to the first location registration request signal, and transmitting a first location registration response signal to the first mobile terminal; registering the location of the second mobile terminal with the second area group including the second area in response to the second location registration request signal, and transmitting a second location registration response signal to the second mobile terminal; storing, at the first mobile terminal, the first area included in the first location registration response signal as a current location registration area; and storing, at the second mobile terminal, the second area group included in the second location registration response signal as a current location registration area.

In the first aspect, the communication method can further include the step of: transmitting, from the second mobile terminal to the radio base station device, a first location registration request signal for the first area included in the broadcast information, when the second area is not included in the broadcast information and the first area is not identical to a first area stored as a current location registration area.

In the first aspect, each of the first areas can be not smaller in size than each of the second areas.

A second aspect of the present invention is summarized as a mobile terminal used in a mobile communication system in which a communication area is managed by being divided into a plurality of first areas, as well as managed by being divided into a plurality of second areas, the mobile terminal including: a location registration area storage unit configured to store, as a current location registration area, one of the plurality of first areas or a second area group including at least one of the plurality of second areas; and a location registration processor unit configured to transmit, to a radio base station device, a second location registration request signal for a second area included in broadcast information transmitted from the radio base station device, when the second area is not included in the second area group which is stored by the location registration area storage unit as the current location registration area.

In the second aspect, the location registration area storage unit can be configured to store, as the current location registration area, the second area group which is included in a second location registration response signal transmitted from the radio base station device.

In the second aspect, the location registration processor unit can be configured to transmit, to the radio base station device, a first location registration request signal for the first area included in the broadcast information, when the second area is not included in the broadcast information and the first area is not identical to a first area stored as a current location registration area.

A third aspect of the present invention is summarized as an switching device used in a mobile communication system in which a communication area is managed by being divided into a plurality of first areas, as well as managed by being divided into a plurality of second areas, wherein when a location registration request signal transmitted from a mobile terminal indicates that the mobile terminal is capable of registering a location thereof with the second areas, and when the location registration request signal has the second area set therein, the switching device is configured to register the location of the mobile terminal with a second area group including the second areas, and to transmit a location registration response signal in which the second area group is set.

In the third aspect, each of the first areas can be not smaller in size than each of the second areas.

A fourth aspect of the present invention is summarized as a radio control device used in a mobile communication system in which a communication area is managed by being divided into a plurality of first areas, as well as managed by being divided into a plurality of second areas, wherein when a location registration request signal transmitted from a mobile terminal indicates that the mobile terminal is capable of registering a location thereof with the second areas, the radio control device is configured to transmit, to an switching device, the location registration request signal in which one of the second areas where the mobile terminal exists is set.

BEST MODE FOR CARRYING OUT THE INVENTION

Configuration of Mobile Communication System According to First Embodiment of Present Invention Referring to FIG. 4 to FIG. 10, a description will be given of a configuration of a mobile communication system according to a first embodiment of the present invention.

In the present embodiment, a 3G (third generation) mobile communication system is described as an example. However, the concept of the mobile communication system according to the present invention is applicable irrespective of radio types, such as 1G, 2G, 3G, Super 3G, 4G, and a wireless LAN.

Figure 1:
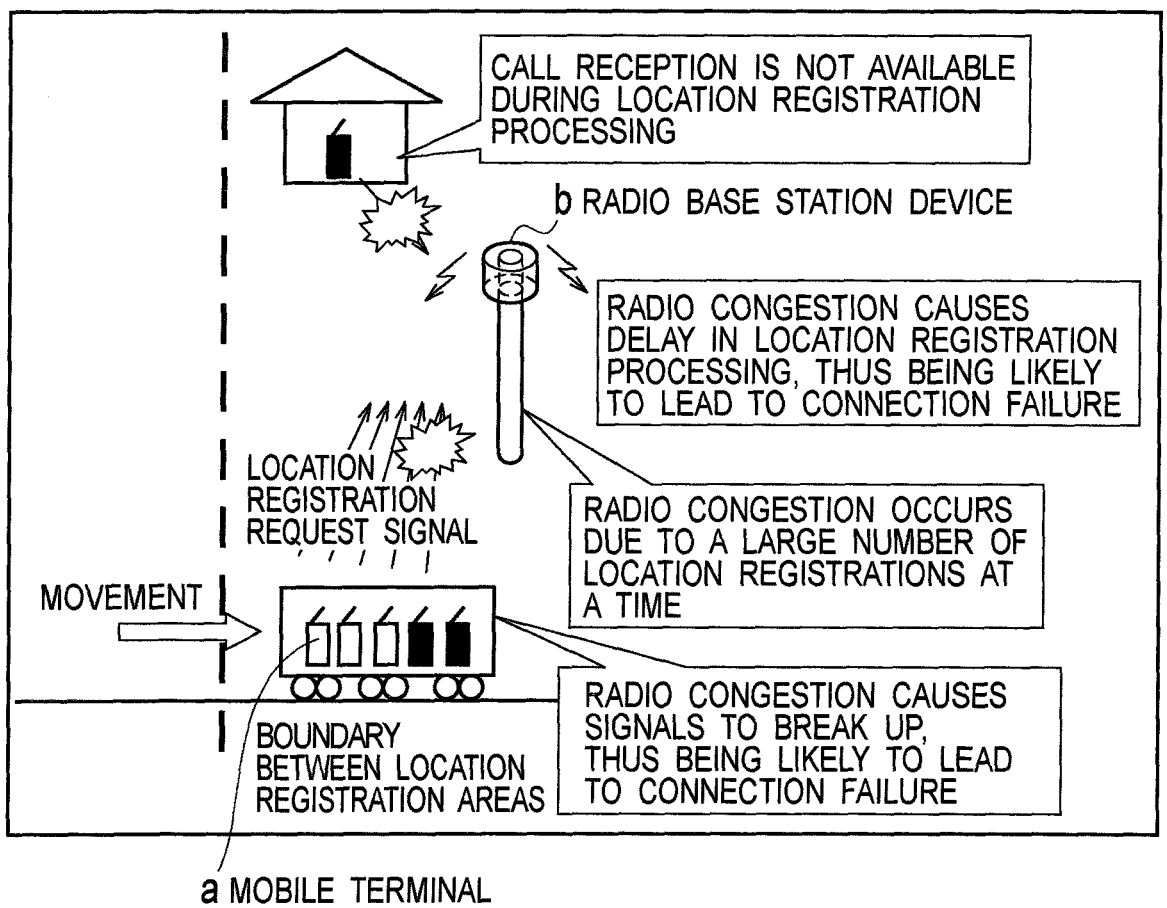
FIG. 1 is a diagram to illustrate a problem of a conventional mobile communication system.
Figure 2:
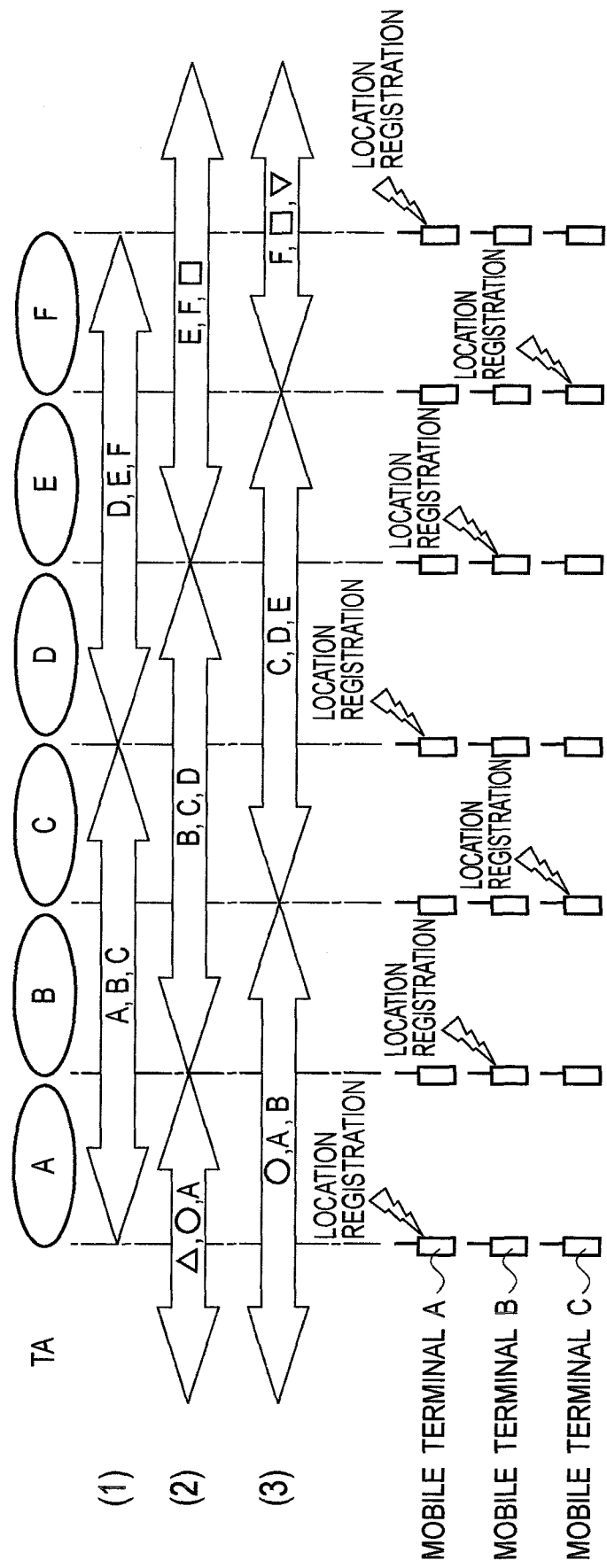
FIG. 2 is a diagram to illustrate a Multiple-TA system.
Figure 3:
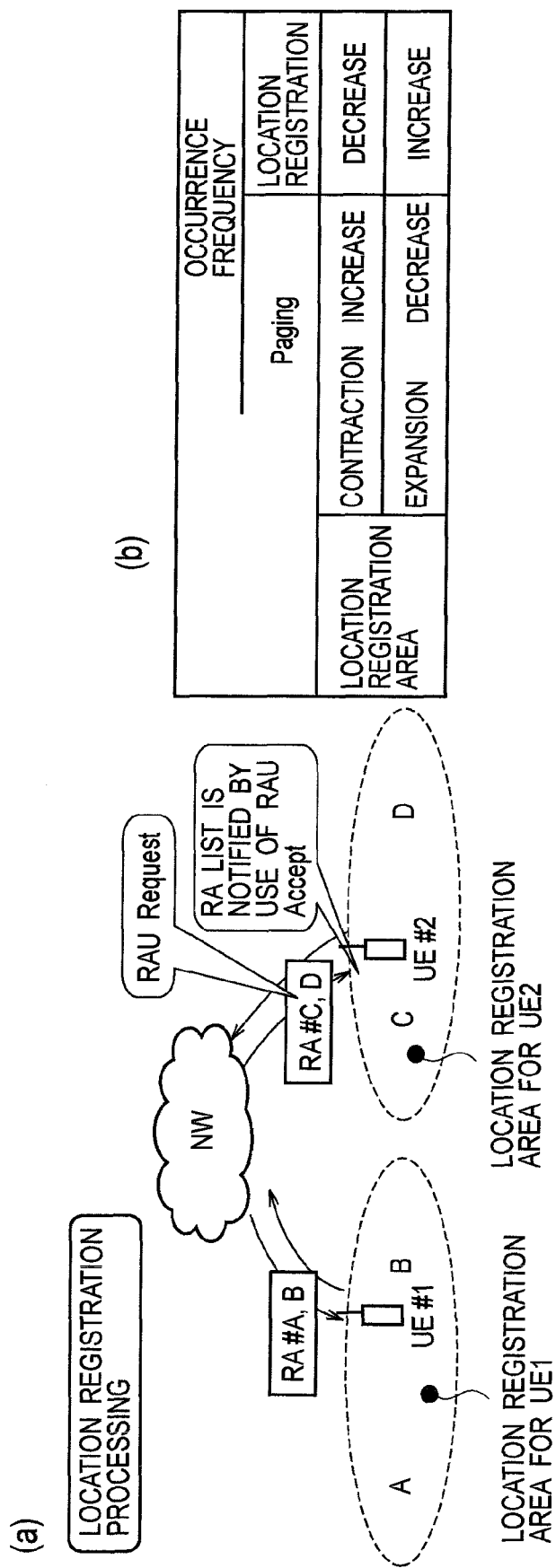
FIG. 3 is a diagram to illustrate a problem of a conventional mobile communication system.
Figure 4:
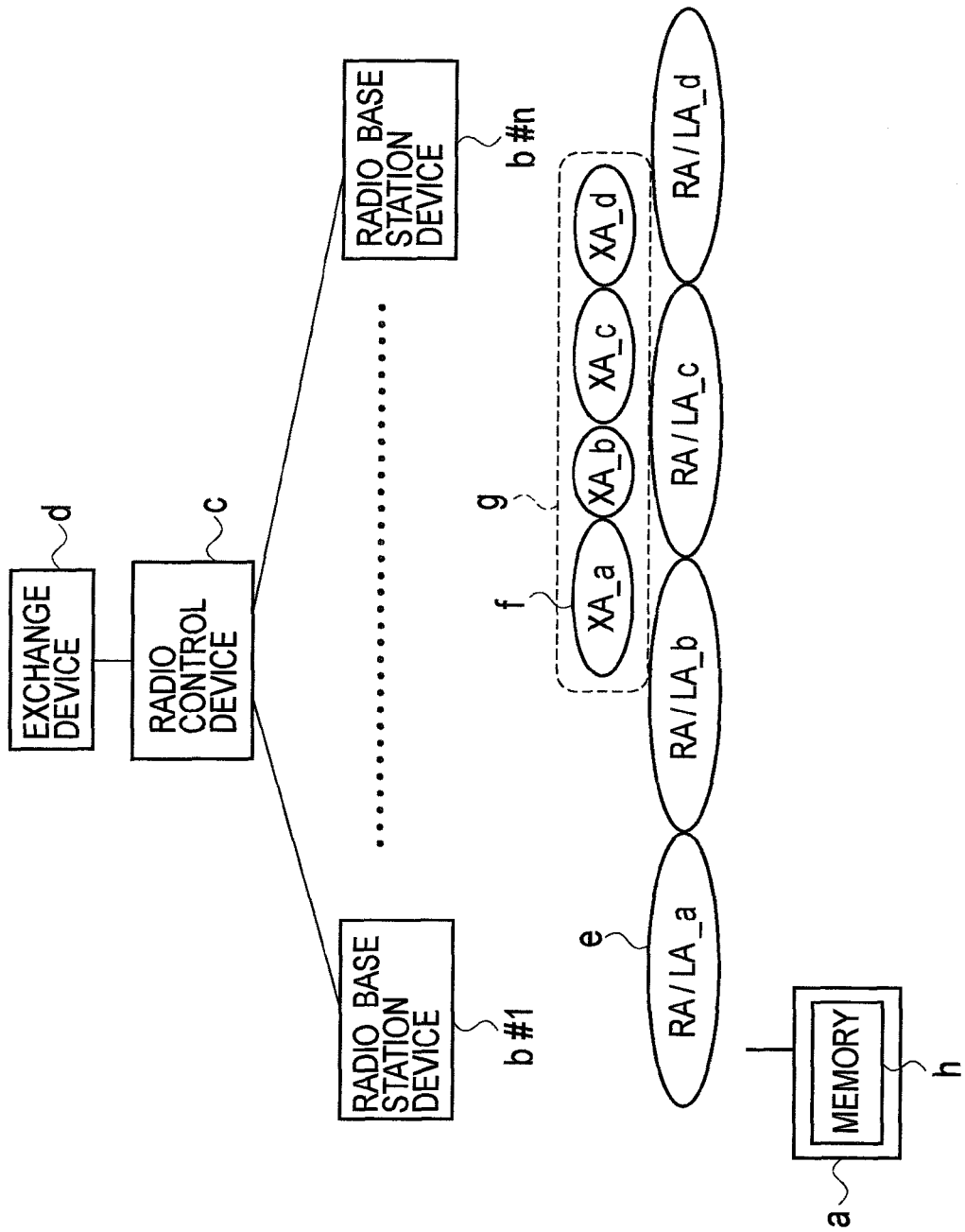
FIG. 4 is an overall configuration diagram of a mobile communication system according to a first embodiment of the present invention.

As shown in FIG. 4, the mobile communication system according to the present embodiment includes a mobile terminal (a), such as a mobile phone, multiple radio base station devices (b#1) to (b#n), a radio control device (c), and an switching device (d).

In addition, in the mobile communication system according to the present embodiment, a location registration area (f) of the "Multiple-TA system" which is defined to be called "XA" by a service carrier is newly defined so as to be usable in combination with an existing location registration area (RA/LA) (e) which is defined to be called "RA/LA" by a service carrier.

Specifically, the mobile communication system according to the present embodiment is configured to manage a communication area by diving the communication area into multiple first areas (RA/LA) (e), as well as into multiple second areas (XA) (f).

Further, in the mobile communication system according to the present embodiment, coexistence of an area where only the RA/LA is established (for example, RA/LA_a) and an area where the XA is also established in addition to the RA/LA (for example, RA/LA_b to RA/LA_d) is achieved.

Furthermore, in the mobile communication system according to the present embodiment, the mobile terminal (a) performs location registration processing by taking only the XA into consideration and ignoring the RA/LA, in the area where XA is established.

Meanwhile, in the mobile communication system according to the present embodiment, the mobile terminal (a) performs location registration processing in the same way as usual in the area where only the RA/LA is established.

Additionally, the mobile communication system according to the present embodiment is configured such that an XA list (g) including multiple XAs (for example, XA_a to XA_d) is formed.

Here, the mobile terminals (a) are respectively assigned different XA lists (g), and thereby have different boundary regions between location registration areas. Accordingly, decentralization of location registration can be achieved.

Here, the mobile terminal (a) includes a memory (h) which is configured to store a current location registration area.

Figure 5:
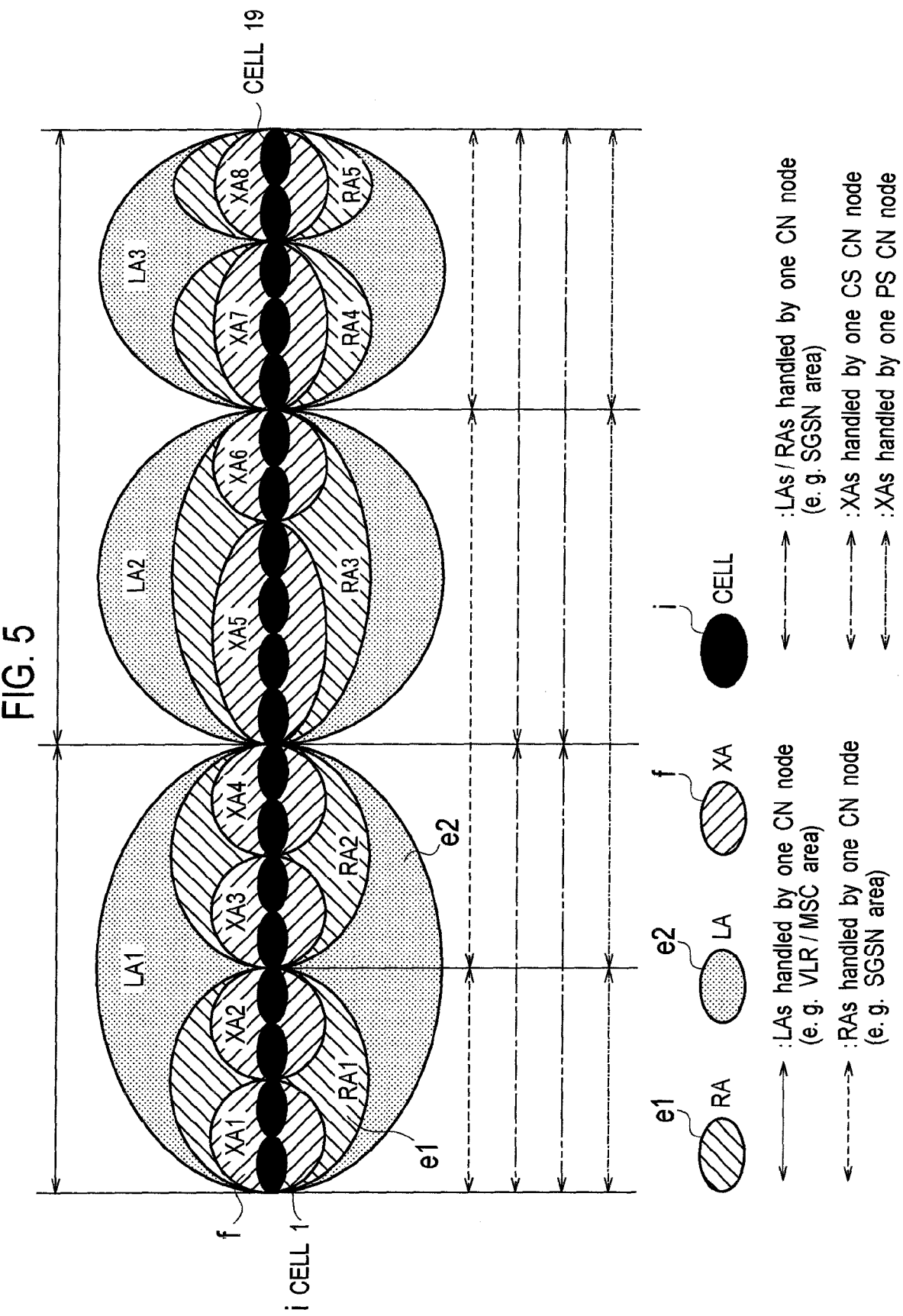
FIG. 5 is a diagram to illustrate a new location registration area (XA) according to the first embodiment of the present invention.

As shown in FIG. 5, the XA is defined to have a size smaller than a size of an LA which is a location registration area for circuit switching and to have a size equal to or smaller than a size of an RA which is a location registration area for packet switching. The XA is configured to include multiple cells.

Moreover, the XA may be defined so as to overlap the LA or the RA in a certain area. Alternatively, the XA may be defined in a certain spot as needed, not across the entire network.

Inclusion relation is determined as "LA≧RA≧XA≧cell", in principle. Instead, all inclusion relations "LA≧RA", "an area covered by a single switching device for circuit switching≧XA", and "an area covered by a single switching device for packet switching≧XA" may be satisfied.

Moreover, in principle, an XA is managed by a single ID irrespective of in the circuit switched (CS) domain or in the packet switched (PS) domain. Instead, an XA may be managed by different IDs.

When the mobile terminal (a) moves out of the XAs included in the current XA list (g) stored in the mobile terminal (a), the mobile terminal (a) performs location information update processing to acquire a new XA list (g).

Figure 6:
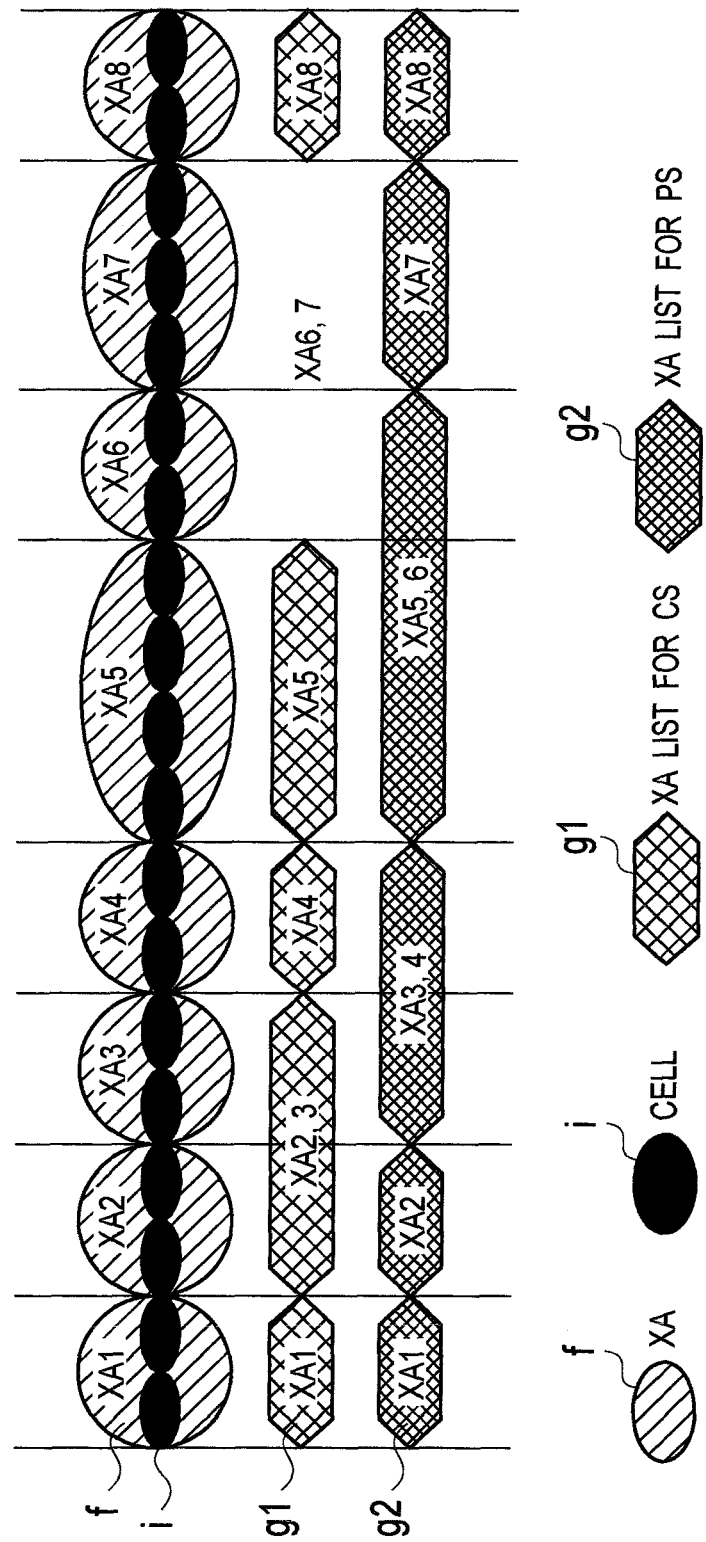
FIG. 6 is a diagram to illustrate a new location registration area (XA) list according to the first embodiment of the present invention.

Moreover, the mobile communication system according to the present embodiment is configured such that XA lists (g) are respectively allocated to subscribers, as shown in FIG. 6.

Here, the mobile communication system according to the present embodiment may be configured to allocate a single XA list (g) to a CS domain and PS domain for each subscriber.

Alternatively, in a case where the CS domain and PS domain for each subscriber have different XAs, the CS domain and PS domain for each subscriber may keep different XA lists (XA list (g1) for CS and XA list (g2) for PS).

Inclusion relations of the XA list g are shown as follows.

"an area covered by a single switching device for circuit switching≧an area consisted of XA included in XA list" and "an area covered by a single switching device for packet switching≧an area consisted of XA included in XA list"

Note that in a case where the switching device is configured to perform distributed control (Iu-Flex), inclusion relations to be satisfied are "a distributed control area by the switching device for circuit switching≧an area consisted of XA included in XA list" and "a distributed control area by the switching device for packet switching≧an area consisted of XA included in XA list".

Hereinbelow, location registration processing in the mobile communication system according to the present embodiment will be described in detail referring to FIG. 7 to FIG. 10.

Figure 7:
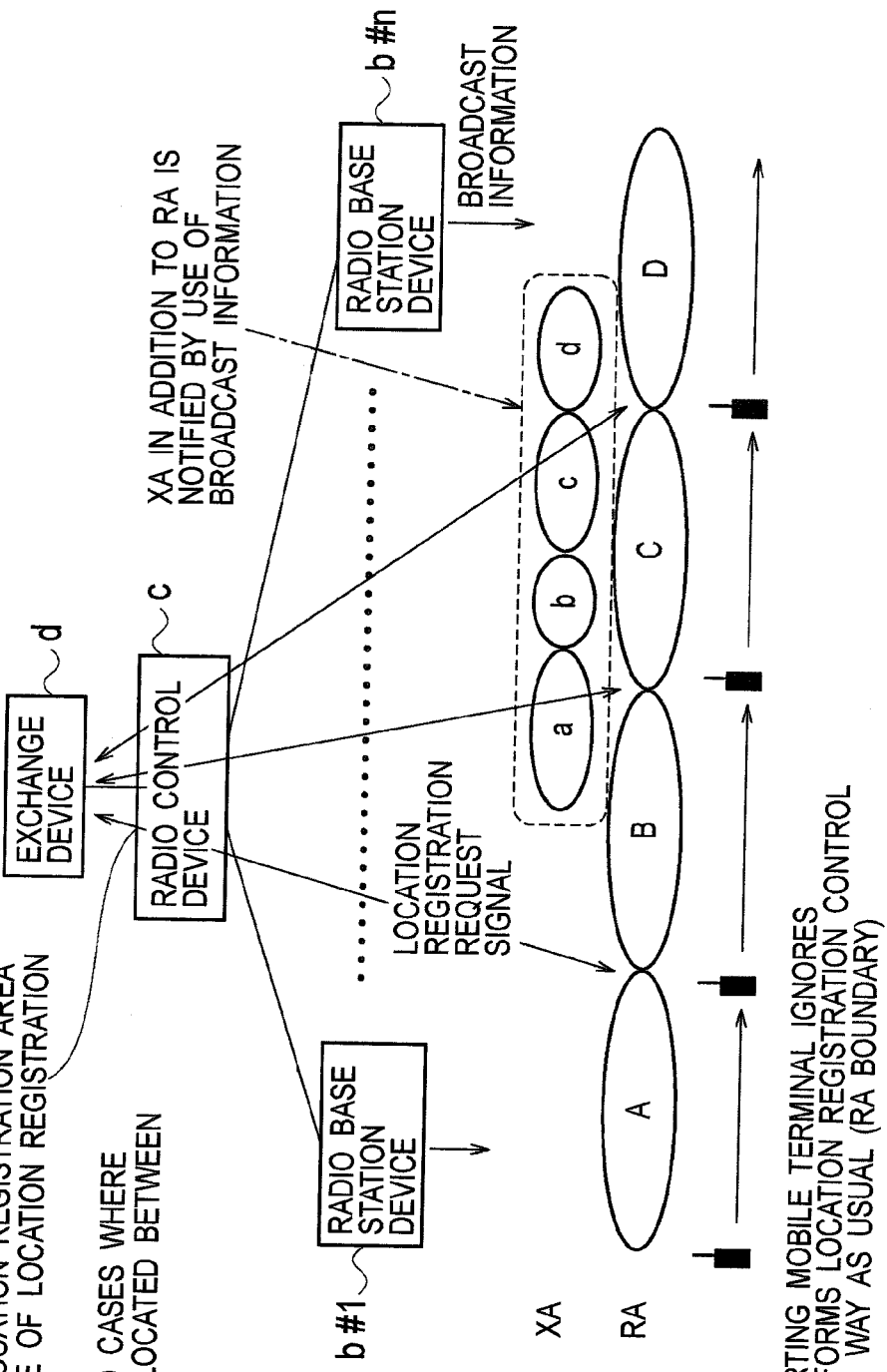
FIG. 7 is a diagram to illustrate an operation in the mobile communication system according to the first embodiment of the present invention.

First, as shown in FIG. 7, an XA non-supporting mobile terminal (first mobile terminal) which is incapable of registering its location with an XA (second area) is configured to perform existing location registration processing and ignore an XA even when the XA is included in broadcast information transmitted from the radio base station device (b).

Specifically, the XA non-supporting mobile terminal is configured to transmit a first location registration request signal for an RA_B (first area) to the radio control device (c) in a case where the RA_B (first area) included in the received broadcast information is non-identical to an RA_A (first area) stored as a current location registration area.

Further, in response to the first location registration request signal, the radio control device (c) is configured to register the location of the XA non-supporting mobile terminal with the RA_B (first area) and transmit a first location registration response signal to the XA non-supporting mobile terminal.

Furthermore, the XA non-supporting mobile terminal is configured to store the RA-B (first area) included in the received first location registration response signal, as the current location registration area.

Figure 8:
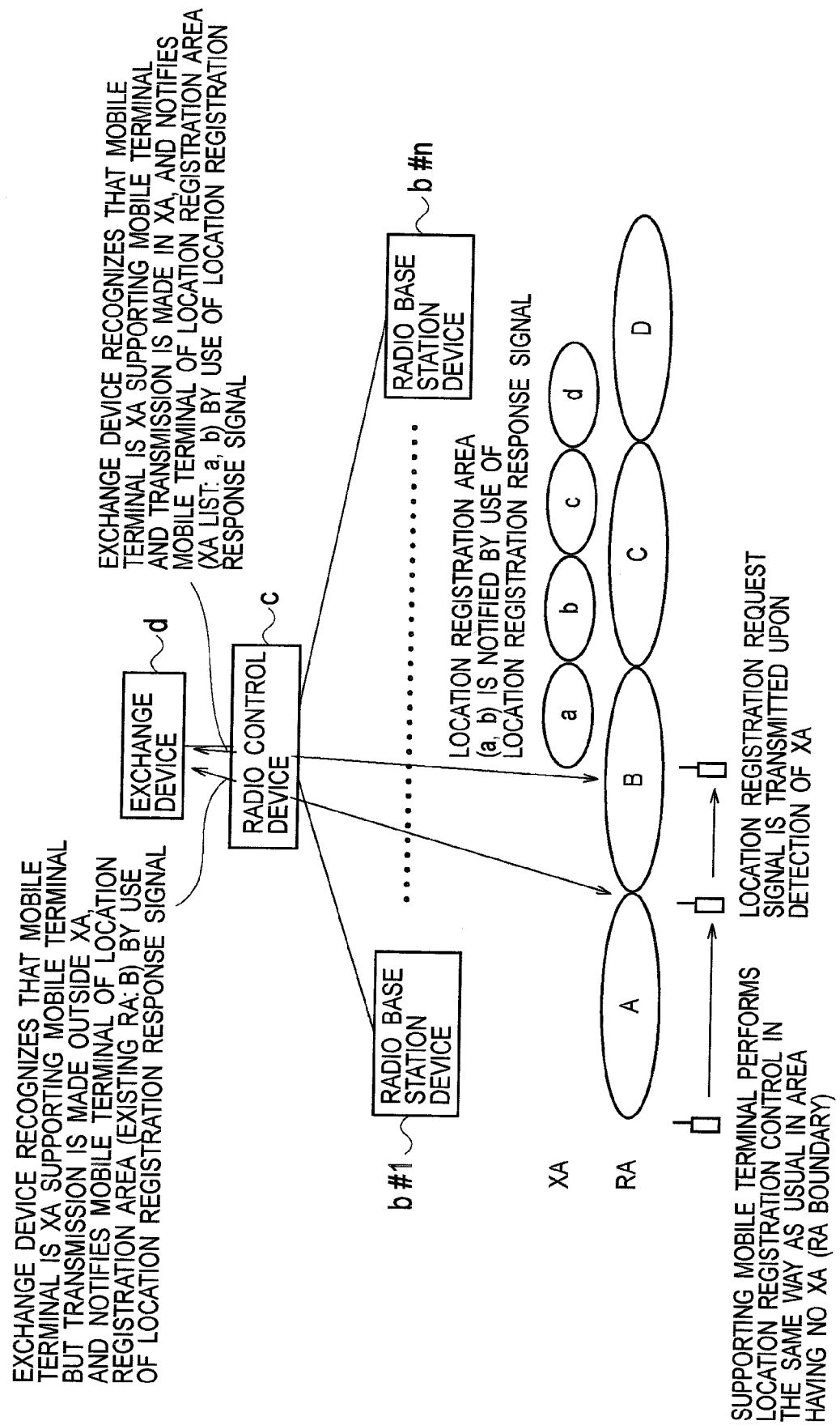
FIG. 8 is a diagram to illustrate an operation in the mobile communication system according to the first embodiment of the present invention.

Secondly, as shown in FIG. 8, an XA supporting mobile terminal (second mobile terminal) which is capable of registering its location with an XA (second area) is configured to perform existing location registration processing in an area where no XA is established, i.e., in a case where no XA is included in broadcast information transmitted from the radio base station device b.

Specifically, the XA supporting mobile terminal is configured to transmit a first location registration request signal for an RA_B (first area) to the radio control device (c), in a case where the RA_B (first area) included in the received broadcast information is non-identical to an RA_A (first area) stored as the current location registration area.

Meanwhile, the XA supporting mobile terminal is configured to transmit a second location registration request signal for an XA_a to the radio control device (c), in a case where the broadcast information transmitted from the radio base station device (b) includes the XA_a (second area) and where the XA_a included in the broadcast information is not included in an XA list (second area group) stored as the current location registration area.

Further, in response to the received second location registration request signal, the radio control device (c) is configured to register the location of the XA supporting mobile terminal with the XA list (second area group) which is consisted of the XA_a and an XA_b and thus includes the XA_a (second area), and transmit a second location registration response signal to the XA supporting mobile terminal.

Furthermore, the XA supporting mobile terminal is configured to store the XA list (second area group) included in the received second location registration response signal, as the current location registration area.

Figure 9:
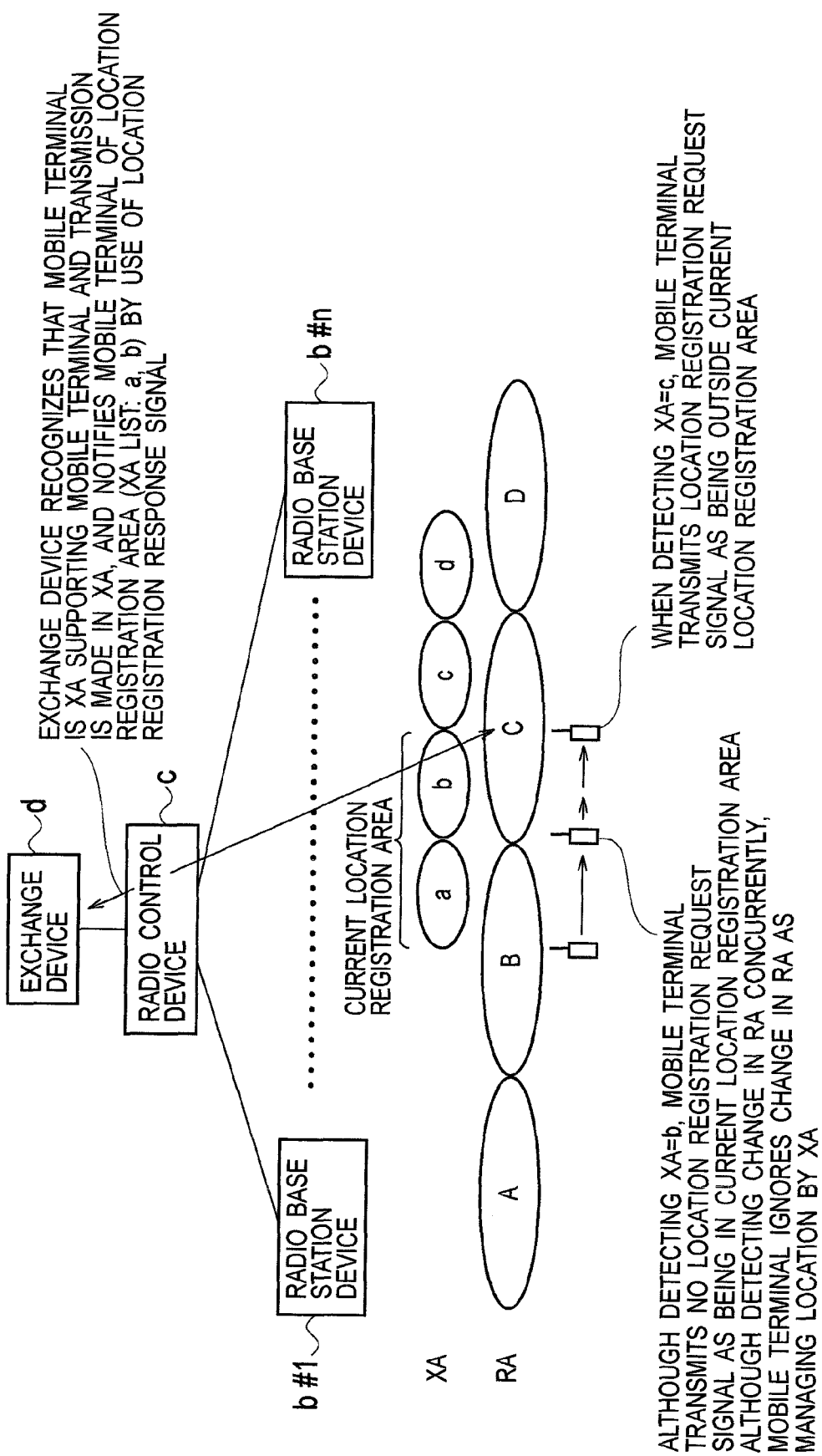
FIG. 9 is a diagram to illustrate an operation in the mobile communication system according to the first embodiment of the present invention.

Thirdly, consider a case where the XA supporting mobile terminal is located in a boundary region between the XA_a and the XA_b as shown in FIG. 9. Here, the XA_b included in broadcast information received from the radio base station device (b) is included in the XA list (second area group) stored as the current location registration area. Therefore, in this case, the XA supporting mobile terminal is configured to determine that the location of the XA_b has already been registered with the XA list and ignore the XA_b without transmitting a second location registration request signal for the XA_b.

Meanwhile, consider a case where the XA supporting mobile terminal is located in a boundary region between the XA_b and an XA_c. Here, the XA_c included in broadcast information received from the radio base station device (b) is not included in the XA list (second area group) stored as the current location registration area. Therefore, in this case, the XA supporting mobile terminal is configured to determine that the location of the XA_c has not been registered yet and transmit a second location registration request signal for the XA_c.

Figure 10:
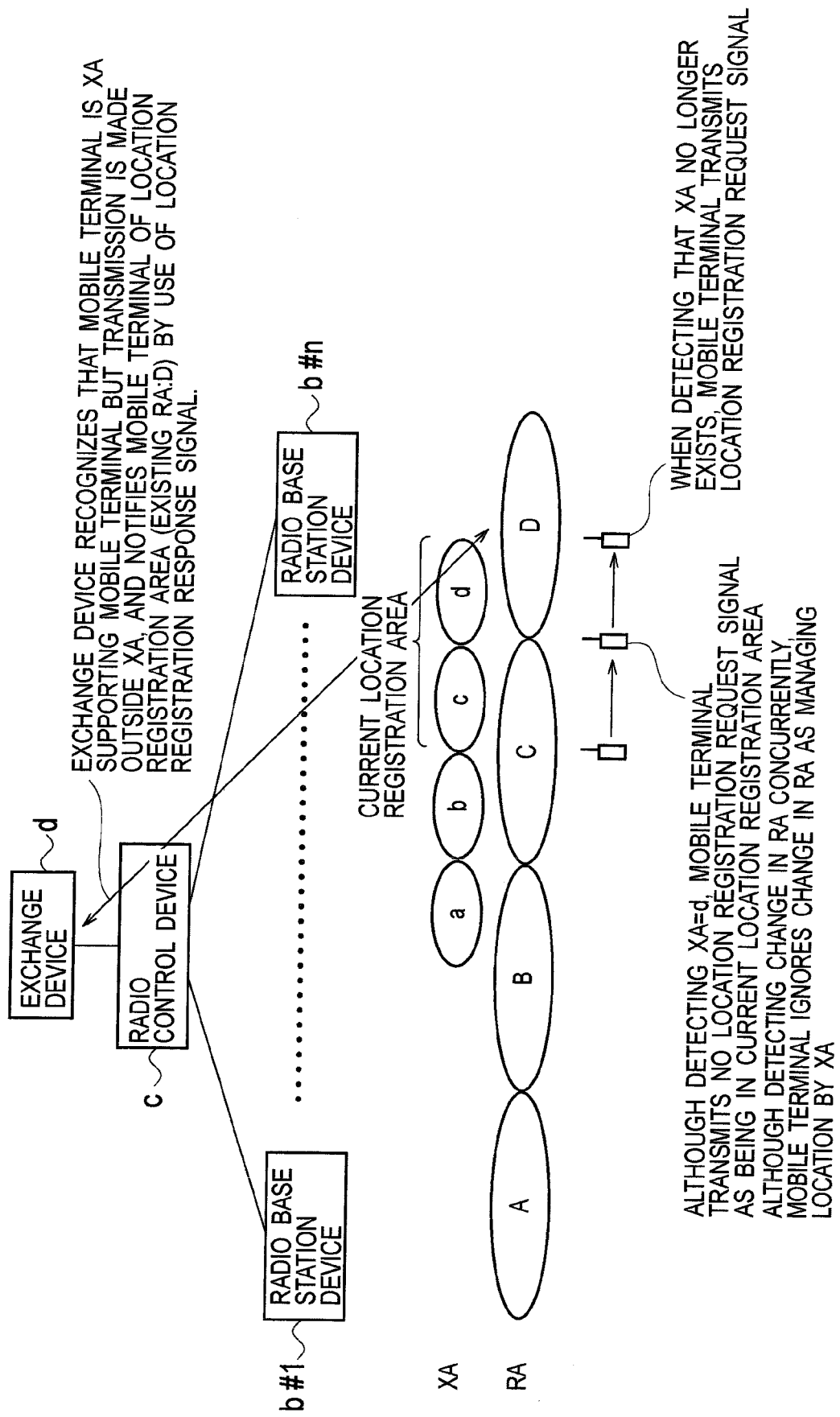
FIG. 10 is a diagram to illustrate an operation in the mobile communication system according to the first embodiment of the present invention.

Fourthly, consider a case where the XA supporting mobile terminal moves out of an XA_d as shown in FIG. 10. Here, broadcast information received from the radio base station device (b) includes no XA. Accordingly, in this case, the XA supporting mobile terminal is configured to transmit a first location registration request signal for an RA_D included in the broadcast information.

Operation of Mobile Communication System According to First Embodiment of Present Invention Hereinbelow, referring to FIG. 11 to FIG. 18, an operation of the mobile communication system according to the present embodiment will be described.

In the present embodiment, the description will be given on the assumption that location registration processing is performed by use of RA and XA of the 3G mobile communication system. However, the operation of the present invention is basically the same for location registration processing by use of LA and XA or for location registration processing by use of LA, RA, and XA in combination. Accordingly, the present invention is also applicable to such location registration processing.

Further, in the following example, location registration processing for a case where a mobile terminal moves beyond a location registration area is exemplified, but the present invention is also applicable for periodic location registration processing.

Firstly, referring to FIG. 11, a description will be given of an operation to make notification of broadcast information in the mobile communication system according to the present embodiment.

Figure 11:
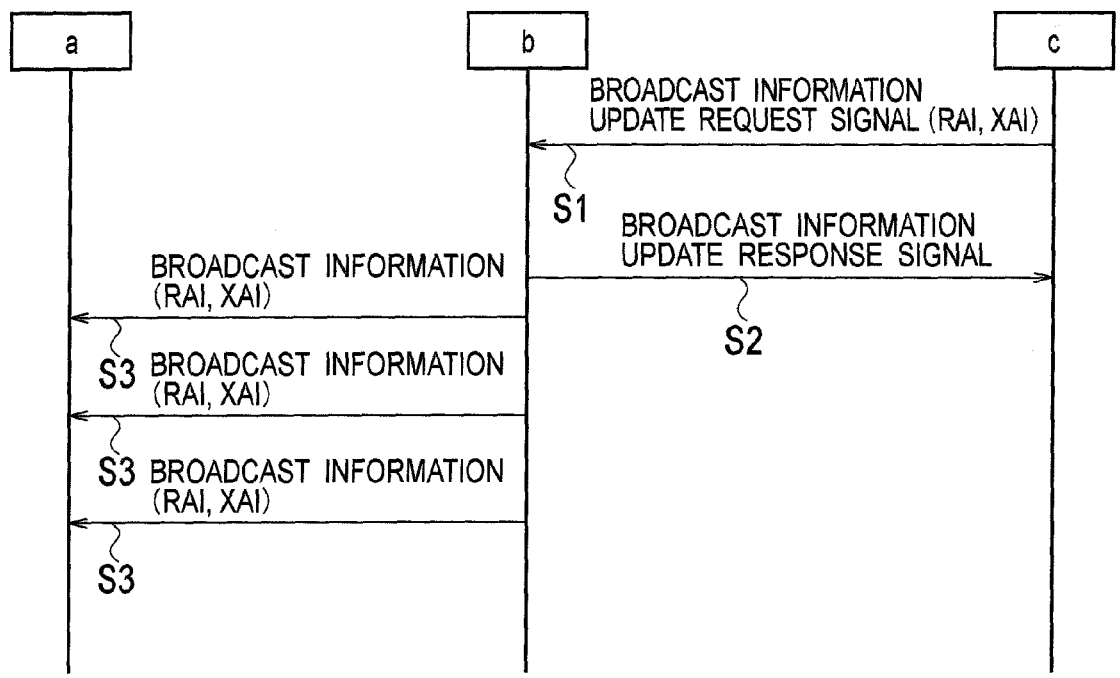
FIG. 11 is a sequence chart showing an operation to transmit broadcast information in the mobile communication system according to the first embodiment of the present invention.

As shown in FIG. 11, in Step S1, in an XA supporting region (region where an XA is established), the radio control device (c) transmits a broadcast information update request signal to the radio base station device (b), the broadcast information update request signal including an identifier (XAI) to identify an XA in addition to an identifier (RAI) to identify an RA.

In Step S2, the radio base station device (b) transmits a broadcast information update response signal to the radio control device (c).

In Step S3, the radio base station device (b) having received the broadcast information update request signal sets an XAI in addition to an RAI to broadcast information, and notifies the mobile terminal (a) of the broadcast information.

Secondly, referring to FIG. 12, a description will be given of location registration processing for a case where the XA supporting mobile terminal (a) is located in an XA in the mobile communication system according to the present embodiment.

In Step S4, on the basis of the XAI set in the broadcast information received from the radio base station device (b), the XA supporting mobile terminal (a) recognizes that it has entered an XA supporting area which is out of an area stored as the current location registration area.

In Step S5, a connection is established among the XA supporting mobile terminal (a), the radio base station device (b), and the radio control device (c).

After the connection has been established, in Step S6, the XA supporting mobile terminal (a) transmits a location registration request signal (second location registration request signal) for an XA included in the broadcast information, to the radio control device (c).

Here, the location registration request signal may be a publicly-known signal or may be a newly defined signal. In addition, an XA supporting flag is set in the location registration request signal to notify the radio control device (c) that the XA supporting mobile terminal (a) is capable of registering its location with an XA.

In Step S7, the radio control device c having received the location registration request signal transmits a location registration request signal to the switching device d.

An XA supporting flag, and an RA and an XA in which the XA supporting mobile terminal (a) is located, are set in the location registration request signal. In addition, the location registration request signal may be a publicly-known signal or may be a newly defined signal.

In Step S8, the switching device (d) having received the location registration request signal and the mobile terminal (a) perform authentication processing and concealment processing as needed.

In Step S9, upon completion of the authentication processing and the concealment processing, the switching device (d) registers the location of the XA supporting mobile terminal (a) with multiple XAs including the XA included in the location registration request signal, and transmits a location registration response signal (second location registration response signal) to the radio control device (c).

The location registration response signal has an XA list (g) set thereto, the XA list (g) including the multiple XAs with each of which the location of the XA supporting mobile terminal (a) is registered. Here, the location registration response signal also may be a publicly-known signal or may be a newly defined signal.

In Step S10, the radio control device (c) transmits the location registration response signal to the mobile terminal (a).

Thirdly, referring to FIG. 13, a description will be given of location registration processing for a case where the XA supporting mobile terminal (a) is located in an area where only the RA is established and no XA is used, in the mobile communication system according to the present embodiment.

In Step S11, on the basis of the RAI set in the broadcast information received from the radio base station device (b), the XA supporting mobile terminal (a) recognizes that it has entered an XA non-supporting area (RA) which is out of an area stored as the current location registration area.

In Step S12, a connection is established among the XA supporting mobile terminal (a), the radio base station device (b), and the radio control device (c).

After the connection has been established, in Step S13, the XA supporting mobile terminal (a) transmits a location registration request signal (first location registration request signal) for an RA included in the broadcast information, to the radio control device (c).

Here, the location registration request signal may be a publicly-known signal or may be a newly defined signal. In addition, an XA supporting flag is set in the location registration request signal to notify the radio control device (c) that the XA supporting mobile terminal (a) is capable of registering its location with an XA.

In Step S14, the radio control device (c) having received the location registration request signal transmits a location registration request signal to the switching device (d).

An XA supporting flag, and an RA in which the XA supporting mobile terminal (a) is located, are set in the location registration request signal. In addition, the location registration request signal may be a publicly-known signal or may be a newly defined signal.

In Step S15, the switching device (d) having received the location registration request signal and the mobile terminal (a) perform authentication processing and concealment processing as needed.

In Step S16, upon completion of the authentication processing and the concealment processing, the switching device (d) registers the location of the XA supporting mobile terminal (a) with the RA included in the location registration request signal, and transmits a location registration response signal (first location registration response signal) to the radio control device (c).

The RA with which the location of the XA supporting mobile terminal (a) is registered is set in the location registration response signal. Here, the location registration response signal also may be a publicly-known signal or may be a newly defined signal.

In Step S17, the radio control device (c) transmits the location registration response signal to the mobile terminal (a).

Figure 14:
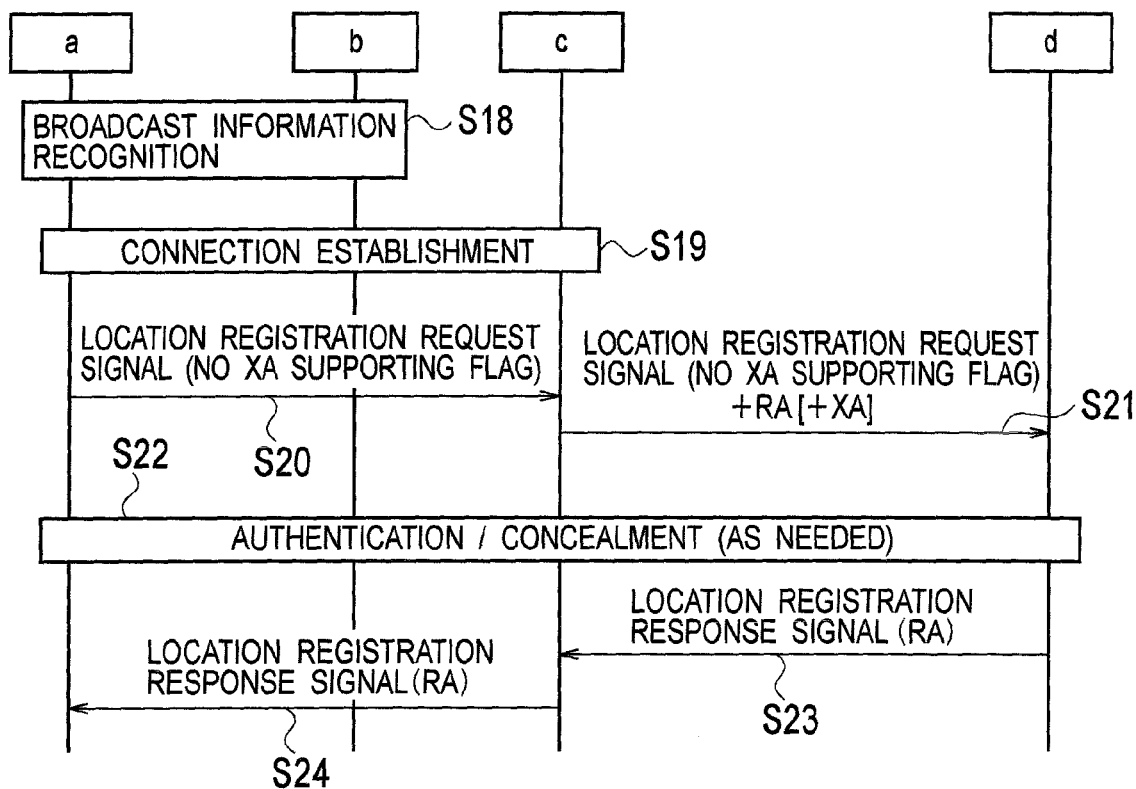
FIG. 14 is a sequence chart showing an operation to register a location in the mobile communication system according to the first embodiment of the present invention.

Fourthly, referring to FIG. 14, a description will be given of location registration processing for a case where the XA non-supporting mobile terminal (a) is located in an area where only the RA is established and no XA is used or in an area where both the XA and the RA are used, in the mobile communication system according to the present embodiment.

In Step S18, on the basis of the RAI set in the broadcast information received from the radio base station device (b), the XA non-supporting mobile terminal (a) recognizes that it has entered an RA which is not identical to the RA stored as the current location registration area.

In Step S19, a connection is established among the XA non-supporting mobile terminal (a), the radio base station device (b), and the radio control device (c).

After the connection has been established, in Step S20, the XA non-supporting mobile terminal (a) transmits a location registration request signal (first location registration request signal) for an RA included in the broadcast information, to the radio control device (c).

Here, the location registration request signal may be a publicly-known signal or may be a newly defined signal. In addition, no XA supporting flag is set in the location registration request signal to notify the radio control device (c) that the XA non-supporting mobile terminal (a) is incapable of registering its location with an XA.

In Step S21, the radio control device (c) having received the location registration request signal transmits a location registration request signal to the switching device (d).

No XA supporting flag is set in the location registration request signal, but an RA in which the XA non-supporting mobile terminal (a) is located, and an XA are set in the location registration request signal, the XA being defined so as to overlap the RA. In addition, the location registration request signal may be a publicly-known signal or may be a newly defined signal.

In Step S22, the switching device (d) having received the location registration request signal and the mobile terminal (a) perform authentication processing and concealment processing as needed.

In Step S23, upon completion of the authentication processing and the concealment processing, the switching device (d) registers the location of the XA non-supporting mobile terminal (a) with the RA included in the location registration request signal, and transmits a location registration response signal (first location registration response signal) to the radio control device (c).

The RA with which the location of the XA non-supporting mobile terminal (a) is registered is set in the location registration response signal. Here, the location registration response signal also may be a publicly-known signal or may be a newly defined signal.

In Step S24, the radio control device (c) transmits the location registration response signal to the mobile terminal (a).

Next, referring to FIG. 15, a description will be given of an operation of the XA supporting mobile terminal (a) when the XA supporting mobile terminal (a) has changed its location registration area in the mobile communication system according to the present embodiment.

Figure 15:
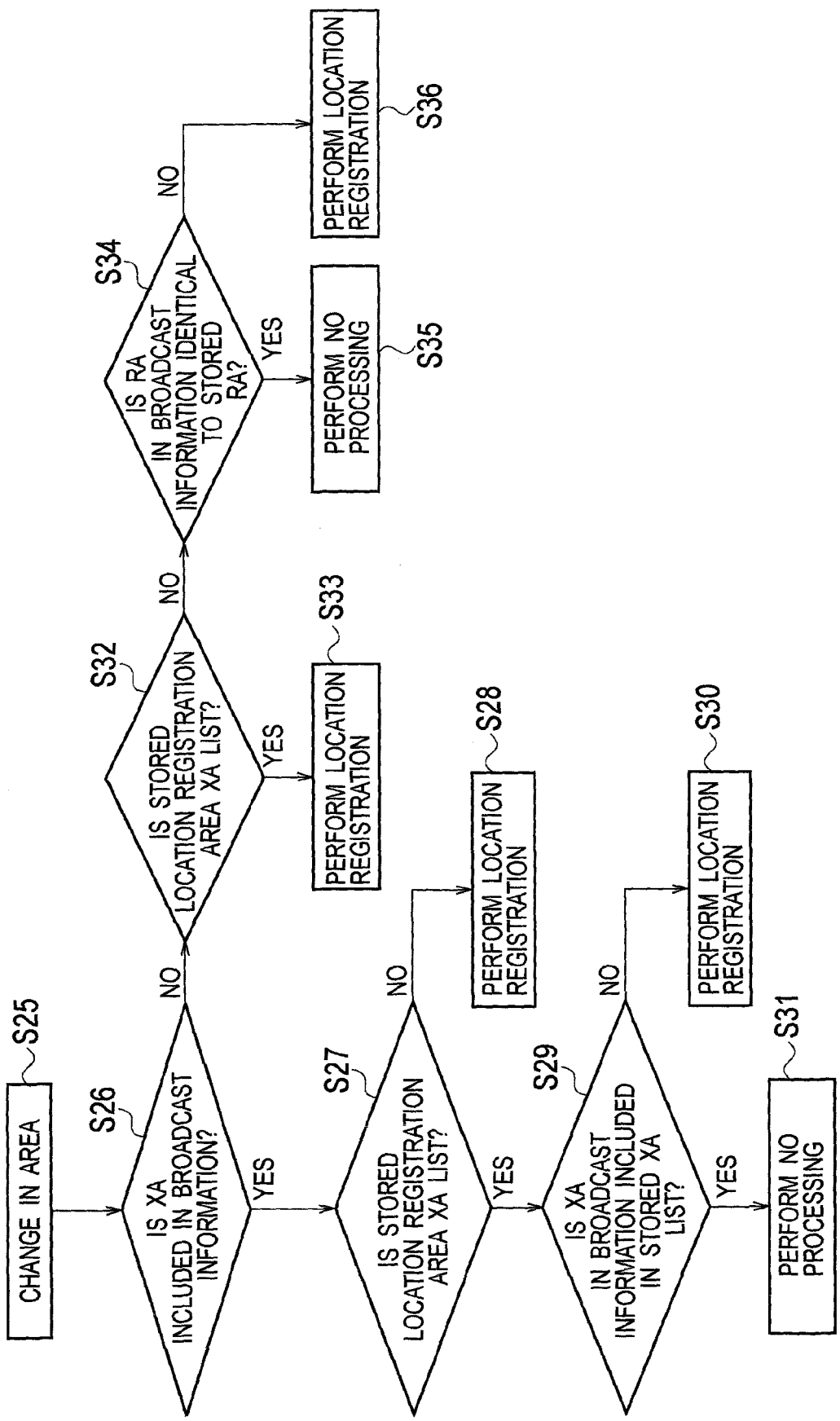
FIG. 15 is a flowchart showing an operation of a mobile terminal according to the first embodiment of the present invention.

As shown in FIG. 15, in Step S25, the XA supporting mobile terminal (a) moves beyond an area.

In Step S26, the XA supporting mobile terminal (a) checks whether or not broadcast information which is received from the radio base station device (b) and which indicates a new area includes an XA.

When an XA is included in the broadcast information, in Step S27, the XA supporting mobile terminal (a) checks whether or not the current location registration area stored in the memory (storage) (h) is an XA list (g), not an RA.

Figure 12:
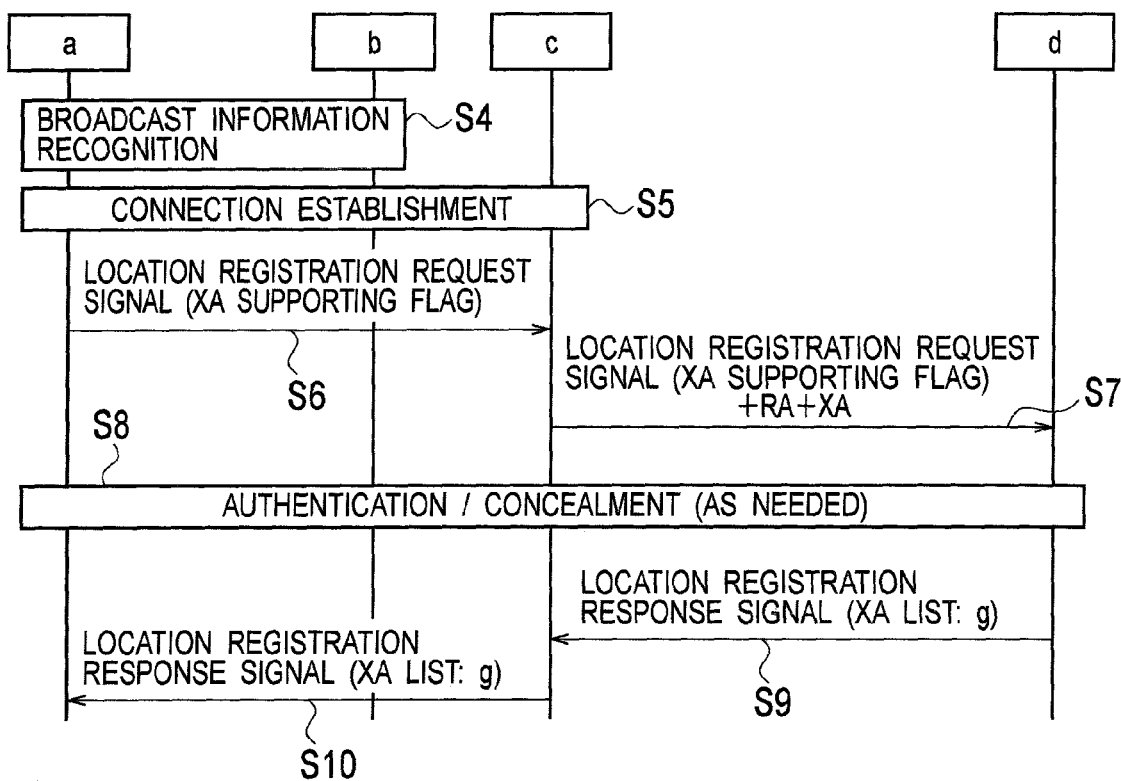
FIG. 12 is a sequence chart showing an operation to register a location in the mobile communication system according to the first embodiment of the present invention.

When the current location registration area stored in the memory (storage) (h) is not the XA list (g), in Step S28, the XA supporting mobile terminal (a) performs location registration processing in accordance with the procedure shown in FIG. 12.

On the other hand, when the current location registration area stored in the memory (storage) (h) is the XA list (g), in Step S29, the XA supporting mobile terminal (a) checks whether or not the XA set in the broadcast information is the XA included in the XA list (g).

When the XA set in the broadcast information is not included in the XA list (g), in Step S30, the XA supporting mobile terminal (a) performs location registration processing in accordance with the procedure shown in FIG. 12.

On the other hand, when the XA set in the broadcast information is included in the XA list (g), the XA supporting mobile terminal (a) performs no location registration processing in Step S29.

In contrast, when no XA is included in the broadcast information from the radio base station device (b), the XA supporting mobile terminal (a) checks whether or not the current location registration area stored in the memory (h) is an XA list (g), not an RA in Step S32.

Figure 13:
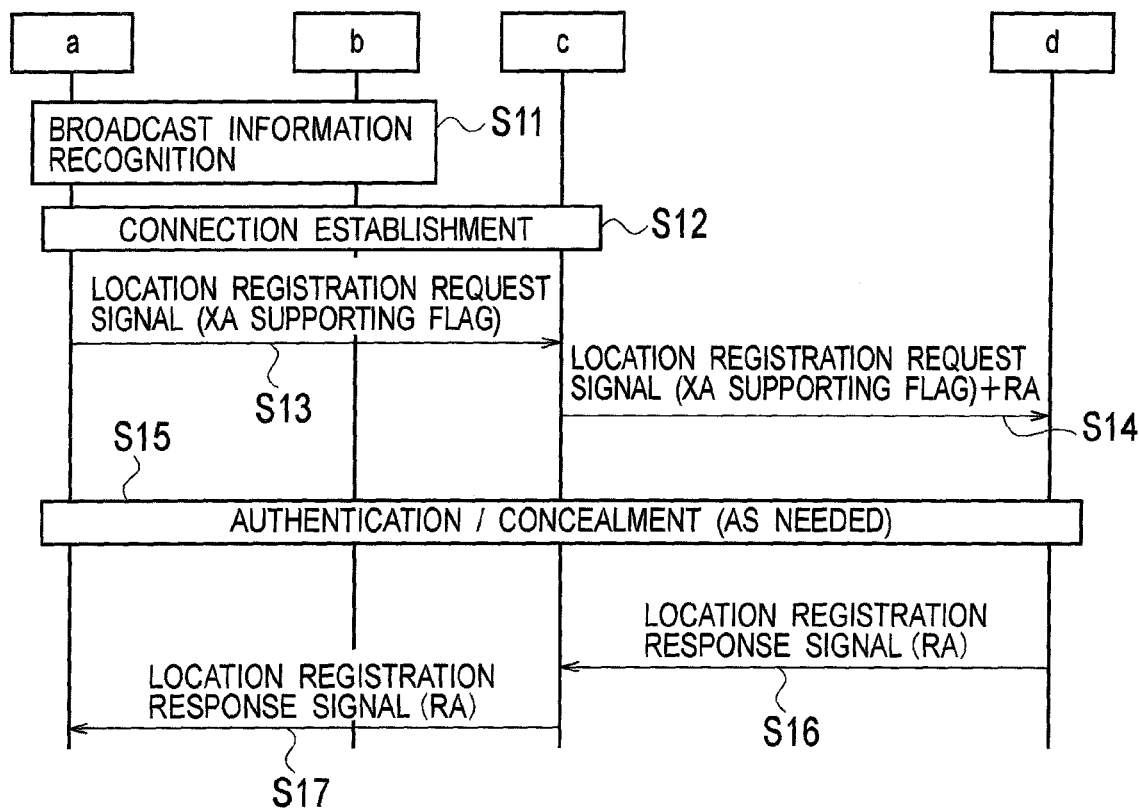
FIG. 13 is a sequence chart showing an operation to register a location in the mobile communication system according to the first embodiment of the present invention.

When the current location registration area stored in the memory (storage) (h) is the XA list (g), in Step S33, the XA supporting mobile terminal (a) performs location registration processing in accordance with the procedure shown in FIG. 13.

On the other hand, when the current location registration area stored in the memory (storage) (h) is not the XA list (g), in Step S34, the XA supporting mobile terminal (a) checks whether or not the RA set in the broadcast information is identical to the current location registration area stored in the memory (h).

When the RA set in the broadcast information is determined to be identical to the current location registration area stored in the memory (h), the XA supporting mobile terminal (a) performs no location registration processing in Step S35.

Conversely, when the RA set in the broadcast information is determined not to be identical to the current location registration area stored in the memory (h), the XA supporting mobile terminal (a) performs location registration processing in Step S36 with an existing procedure.

Next, referring to FIG. 16 and FIG. 17, a description will be given of operations of the XA non-supporting mobile terminal (a) and the XA supporting mobile terminal (a) when the XA non-supporting mobile terminal (a) and the XA supporting mobile terminal (a) complete location registration processing.

Figure 16:
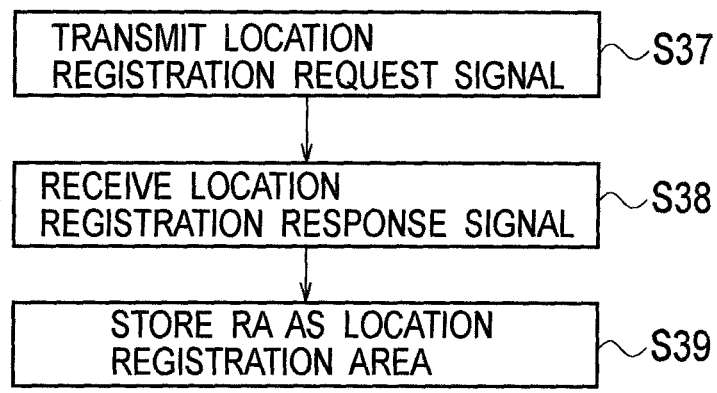
FIG. 16 is a flowchart showing an operation of the mobile terminal according to the first embodiment of the present invention.

As shown in FIG. 16, the XA non-supporting mobile terminal (a) transmits a location registration request signal to the radio control device (c) in Step S37, and receives a location registration response signal from the radio control device (c) via the radio base station device (b) in Step S38.

Subsequently, in Step S39, the XA non-supporting mobile terminal (a) stores in the memory (h) an RA included in the location registration response signal as the current location registration area.

Figure 17:
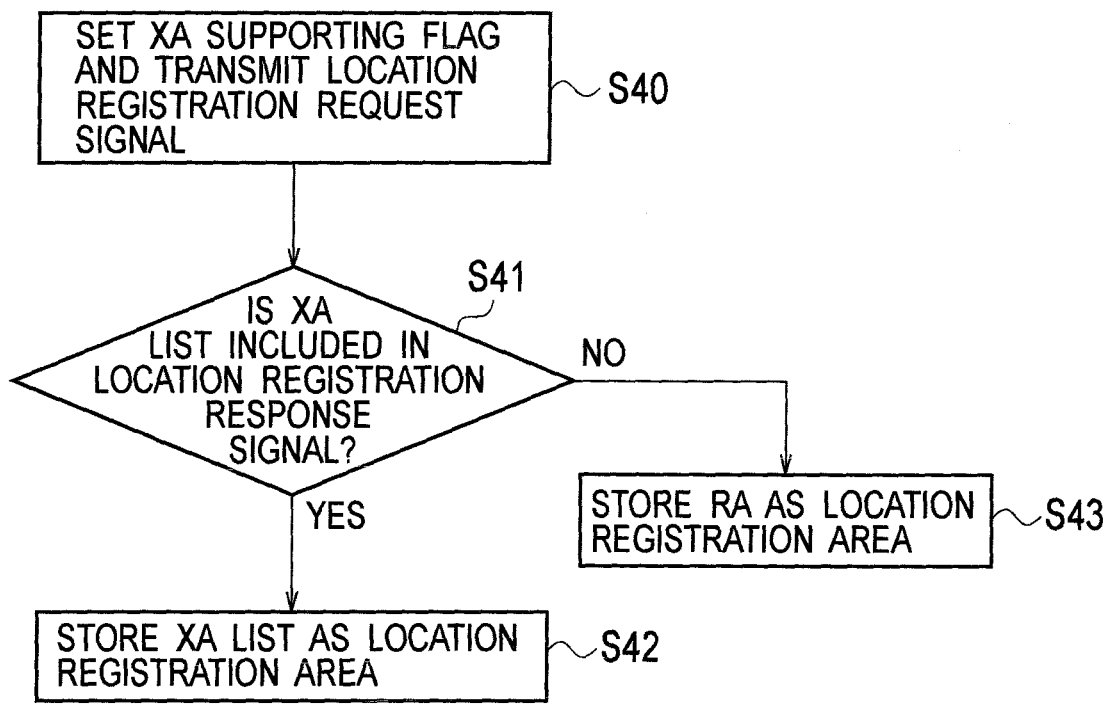
FIG. 17 is a flowchart showing an operation of the mobile terminal according to the first embodiment of the present invention.

Meanwhile, as shown in FIG. 17, in Step S40, the XA supporting mobile terminal (a) transmits the location registration request signal in which an XA supporting flag is set, to the radio control device (c).

In Step S41, upon receipt of the location registration response signal from the radio control device (c), the XA supporting mobile terminal (a) checks whether or not the location registration response signal includes an XA list (g).

When the location registration response signal is determined to include the XA list (g), in Step S42, the XA supporting mobile terminal (a) stores in the memory (h) the XA list (g) included in the location registration response signal as the current location registration area.

When the location registration response signal is determined to include no XA list (g), in Step S43, the XA supporting mobile terminal (a) stores in the memory (h) an RA included in the location registration response signal as the current location registration area.

Next, referring to FIG. 18, a description will be given of an operation of the switching device d when the mobile terminal (a) registers its location.

Figure 18:
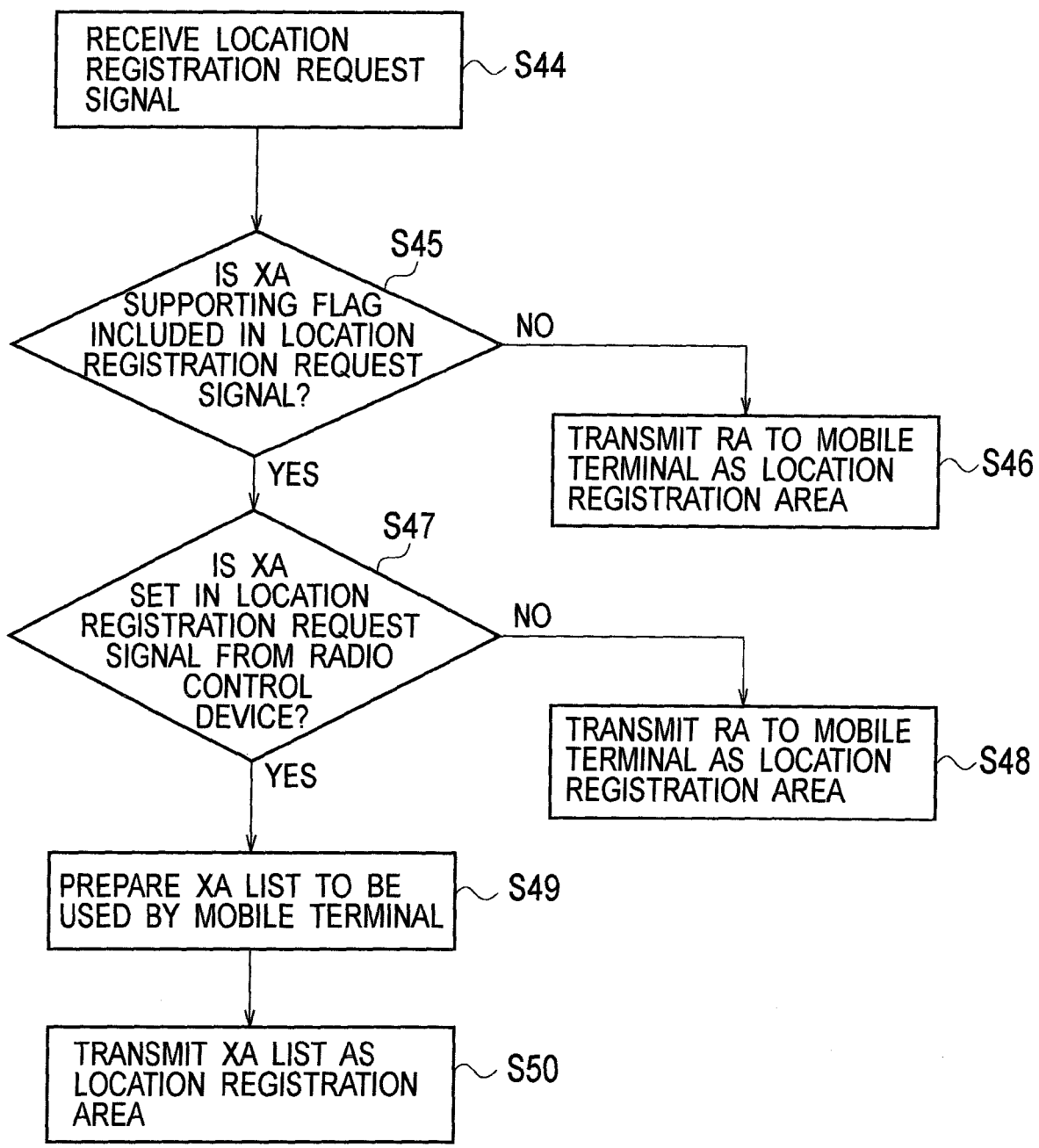
FIG. 18 is a flowchart showing an operation of a switching device according to the first embodiment of the present invention.

As shown in FIG. 18, in Step S44, the switching device (d) receives a location registration request signal from the radio control device (c).

In Step S45, the switching device (d) checks whether or not the location registration request signal has an XA supporting flag set thereto.

When the location registration request signal has no XA supporting flag set thereto, in Step S46, the switching device (d) transmits a location registration response signal in which the switching device (d) sets an RA as a location registration area, to the mobile terminal (a).

By contrast, when the location registration request signal has an XA supporting flag set thereto, in Step S47, the switching device (d) determines whether or not an XA is set in the location registration request signal received from the radio control device (C).

When the location registration request signal has no XA set thereto, in Step S48, the switching device (d) transmits a location registration response signal in which the switching device (d) sets an RA as the location registration area, to the mobile terminal (a).

On the other hand, when the location registration request signal has an XA set thereto, in Step S49, the switching device (d) prepares an XA list (g) to be used by the mobile terminal (a) corresponding to the location registration request signal.

In Step S50, the switching device (d) transmits a location registration response signal in which the prepared XA list (g) is set as the location registration area, to the mobile terminal (a).

Advantages and Effects of Mobile Communication System According To Present Embodiment In the mobile communication system according to the present embodiment, a location registration area (XA) in the "Multiple-TA system" is newly defined, and the location registration area (XA) is designed usable in combination with the existing location registration areas (RA/LA). Therefore, decentralization of location registration processing can be achieved.

The present invention has been described above in detail using the embodiment. However, it is apparent for those skilled in the art that the present invention is not limited to the embodiment described herein. The present invention can be implemented as modifications and alternative embodiments without departing from the gist and scope of the present invention defined by the description of the scope of claims. Accordingly, the description herein is intended only for an exemplary purpose and has no intention to limit the present invention.

Note that the entire content of Japanese Patent Application No. 2007-215317 (filed on Aug. 21, 2007) is incorporated herein by reference.

INDUSTRIAL APPLICABILITY

As has been described, in the communication method, the mobile terminal, the switching device, and the radio control device according to the present invention, a location registration area (XA) in the "Multiple-TA system" is newly defined and the location registration area (XA) is designed usable in combination with the existing location registration areas (RA/LA), so that decentralization of location registration processing can be achieved. Therefore, the communication method, the mobile terminal, the switching device, and the radio control device according to the present invention are useful.

The invention claimed is:

1. A communication method comprising the steps of:
managing the communication area by dividing the communication area into a plurality of first areas applied in a first mobile communication system and a plurality of second areas applied in a second mobile communication system distinct from the first mobile communication system;
transmitting, at a radio base station device, broadcast information for notifying the first area and the second area under control of the radio base station device;
transmitting, from a first mobile terminal incapable of registering a location thereof with the second areas to the radio base station device, a first location registration request signal for the first area included in the broadcast information, when the first area is not identical to a first area stored as a current location registration area; and
transmitting, from a second mobile terminal capable of registering a location thereof with the second areas to the radio base station device, a second location registration request signal for the second area included in the broadcast information, when the second area is not included in a second area group stored as a current location registration area,
wherein the first mobile terminal is configured to perform existing location registration processing and ignore the plurality of second areas when the second areas are included in broadcast information transmitted from the radio base station device, and
wherein the second mobile terminal is configured to perform existing location registration processing in an area when the plurality of second areas are not included in broadcast information transmitted from the radio base station device.

2. The communication method according to claim 1, comprising the steps of:
- registering the location of the first mobile terminal with the first area in response to the first location registration request signal, and transmitting a first location registration response signal to the first mobile terminal;
- registering the location of the second mobile terminal with the second area group including the second area in response to the second location registration request signal, and transmitting a second location registration response signal to the second mobile terminal;
- storing, at the first mobile terminal, the first area included in the first location registration response signal as a current location registration area; and
- storing, at the second mobile terminal, the second area group included in the second location registration response signal as a current location registration area.

3. The communication method according to claim 1, comprising the step of:
- transmitting, from the second mobile terminal to the radio base station device, a first location registration request signal for the first area included in the broadcast information, when the second area is not included in the broadcast information and the first area is not identical to a first area stored as a current location registration area.

4. The communication method according to claim 1, wherein each of the first areas is not smaller in size than each of the second areas.

5. A mobile terminal used in a mobile communication system, the mobile terminal comprising:
- a location registration area storage unit configured to store, as a current location registration area, one of the plurality of first areas or a second area group including at least one of the plurality of second areas; and
- a location registration processor unit configured to transmit, to a radio base station device, a second location registration request signal for a second area included in broadcast information transmitted from the radio base station device, when the second area is not included in the second area group which is stored by the location registration area storage unit as the current location registration area,
- wherein the communication area is managed by being divided into a plurality of first areas applied in a first mobile communication system and a plurality of second areas applied in a second mobile communication system distinct from the first mobile communication system,
- wherein, when the mobile terminal is incapable of registering a location thereof with the second areas, the mobile terminal is configured to perform existing location registration processing and ignore the plurality of second areas when the second areas are included in broadcast information transmitted from the radio base station device, and
- wherein, when the mobile terminal is capable of registering a location thereof with the second areas, the mobile terminal is configured to perform existing location registration processing in an area when the plurality of second areas are not included in broadcast information transmitted from the radio base station device.

6. The mobile terminal according to claim 5, wherein the location registration area storage unit is configured to store, as the current location registration area, the second area group which is included in a second location registration response signal transmitted from the radio base station device.

7. The mobile terminal according to claim 5, wherein the location registration processor unit is configured to transmit, to the radio base station device, a first location registration request signal for the first area included in the broadcast information, when the second area is not included in the broadcast information and the first area is not identical to a first area stored as a current location registration area.

8. An switching device used in a mobile communication system,
- wherein a communication area is managed by being divided into a plurality of first areas applied in a first mobile communication system and a plurality of second areas applied in a second mobile communication system distinct from the first mobile communication system, and
- wherein when a location registration request signal transmitted from a mobile terminal indicates that the mobile terminal is capable of registering a location thereof with the second areas, and when the location registration request signal has the second area set therein, the switching device is configured to register the location of the mobile terminal with a second area group including the second areas, and to transmit a location registration response signal in which the second area group is set,
- wherein, when the mobile terminal is incapable of registering a location thereof with the second areas, the mobile terminal is configured to perform existing location registration processing and ignore the plurality of second areas when the second areas are included in broadcast information transmitted from the radio base station device, and
- wherein, when the mobile terminal is capable of registering a location thereof with the second areas, the mobile terminal is configured to perform existing location registration processing in an area when the plurality of second areas are not included in broadcast information transmitted from the radio base station device.

9. The switching device according to claim 8, wherein each of the first areas is not smaller in size than each of the second areas.

10. A radio control device used in a mobile communication system,
- wherein a communication area is managed by being divided into a plurality of first areas applied in a first mobile communication system and a plurality of second areas applied in a second mobile communication system distinct from the first mobile communication system, and
- wherein when a location registration request signal transmitted from a mobile terminal indicates that the mobile terminal is capable of registering a location thereof with the second areas, the radio control device is configured to transmit, to an switching device, the location registration request signal in which one of the second areas where the mobile terminal exists is set,
- wherein, when the mobile terminal is incapable of registering a location thereof with the second areas, the mobile terminal is configured to perform existing location registration processing and ignore the plurality of second areas when the second areas are included in broadcast information transmitted from the radio base station device, and
- wherein, when the mobile terminal is capable of registering a location thereof with the second areas, the mobile terminal is configured to perform existing location registration processing in an area when the plurality of second areas are not included in broadcast information transmitted from the radio base station device.

* * * * *